United States Patent [19]
Smith

[11] 3,811,196
[45] May 21, 1974

[54] APPARATUS FOR MEASURING A WORK MATERIAL FOR CUTTING TO DESIRED LENGTHS

[76] Inventor: Henry G. Smith, 2944 Sundridge Dr., Troy, Mich. 48084

[22] Filed: June 29, 1972

[21] Appl. No.: 267,666

[52] U.S. Cl.................... 33/185 R, 33/138, 83/468
[51] Int. Cl............................................. B27g 23/00
[58] Field of Search................ 33/185 R, 138, 137; 83/468

[56] References Cited
UNITED STATES PATENTS

| | | |
|---|---|---|
| 2,619,134 | 11/1952 | West.................................. 83/468 |
| 1,461,425 | 7/1923 | Linebaugh........................... 83/468 |
| 1,462,871 | 7/1923 | Rosenberg........................... 83/468 |
| 3,718,061 | 2/1973 | Wilkin................................. 83/468 |

*Primary Examiner*—William D. Martin, Jr.
*Attorney, Agent, or Firm*—Dale Austin Winnie

[57] ABSTRACT

A measuring stop guided for straight line reciprocal and biased movement towards a work tool, means for clamping the stop in a given position apart from the work tool, and a measuring tape having its starting end connected to the reciprocal stop and being extendable and retractable relative to the work tool and set to measure at the work tool the relative distance of the stop, in its clamped position, apart from the work tool.

1 Claim, 10 Drawing Figures

APPARATUS FOR MEASURING A WORK MATERIAL FOR CUTTING TO DESIRED LENGTHS

BACKGROUND OF THE INVENTION

Heretofor lumber yards and saw mills have used a yard stick or measuring tape, to mark lumber, or a measured back-stop, or they have used devices that provide fixed stops at pre-determined positions, for cutting lumber to required lengths.

All of these methods are time consuming in that they require the operator to leave the saw while measuring the lumber, or setting the far end to a measured mark, or in setting the appropriate fixed stop, where such fixed stop devices are used, and then returning to the saw before he can make the required cut. In most lumber yards several different lumber lengths are cut for each customer and consequently there is a great deal of lost time for the operator in setting up the lumber each time before it can actually be cut.

Accuracy is another problem and the old adage that haste makes waste usually proves to be true. Unless an operator has the time and patience, or will take it, to assure a proper setting of a stop and that it is not nudged off in repeated use, or that the far end of the lumber is set precisely to its mark before each cut, errors are bound to happen.

Safety is still another problem, with present methods and devices of measuring lumber to required lengths, in that the operator must leave the saw unattended while setting the lumber to a mark, or setting and checking a stop. Usually, once a power saw is started an operator is not inclined to turn it off for what he assumes will be only a few seconds attention just a few feet away. However, it takes only one of those few seconds, and he is usually away from the saw a good many, for an accident to happen. Moreover, the constant movement of the operator away from the saw and back to it again, diverts his attention each time and makes him much more prone to accidents.

What is needed is a device that enables lumber lengths to be accurately measured at the saw and for the appropriate stop to be set by some remote control means located at or very near the saw so that the operator does not have to leave the saw unattended, his attention is always principally on making the required cut, and his lost time efforts are minimized.

SUMMARY OF THE PRESENT INVENTION

The present invention includes apparatus for accurately measuring and permitting the variable placement of the extremity of a work material, such as the end of a piece of lumber, with respect to a power operated work took, such as a power saw.

As used in combination with a power saw, a fence rail is provided on the work table for the saw and a member with a shoulder stop wall, facing the saw, is guided on the table and the fence rail for reciprocal movement relatively towards and away from the saw. The shoulder stop member is also connected to a tension cable which serves to bias it towards the saw and against the end of a piece of lumber to be cut so that the lumber can be used to move it away from the saw and still maintain the end butting relation.

On the shoulder stop member, which is referred to as the lumber stop, is providing an air operated clamp to lock the reciprocal member in any desired given position to the fence rail. And, the clamp is connected by an air hose to an air supply source near the saw with a toggle valve in the line so it can be actuated by the operator while he remains at the saw.

A measuring tape is then connected to the lumber stop, at the starting end of the tape, and extended to the saw and relatively under a cross-hair sight at the saw so that the relative distance that the shoulder wall stop is from the saw can be accurately read right at the saw. In the embodiment hereinafter described, the measuring tape is passed over and around a pair of tape reels at opposite ends of the fence rail, in an endless run, so that it is relatively extended and retracted under the cross-hair sight as the lumber stop is moved and it shows the fixed location of the stop when the air clamp is applied; which is, in turn, the length of the lumber that will be cut by operating the saw.

DESCRIPTION OF THE DRAWING FIGURES

DETAILED DESCRIPTION OF THE ILLUSTRATED EMBODIMENT

Figure 1:
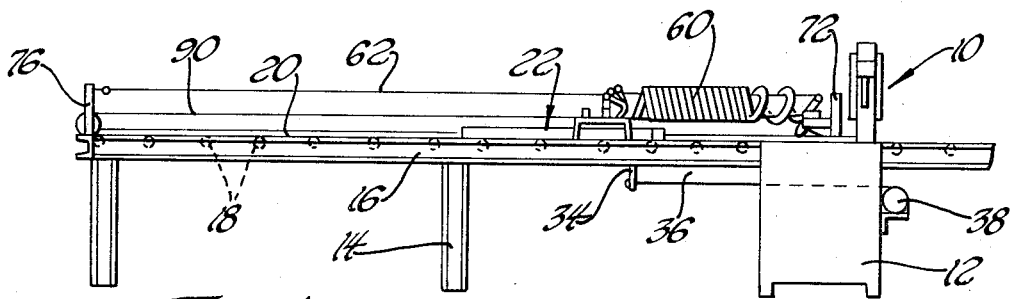
FIG. 1 is a front plan view of the apparatus of the present invention as used with a power saw to measure lumber to length just before it is cut.

A power saw 10 is shown in the first drawing figure mounted over a saw dust bin 12 within a supporting table 14 that receives and supports lumber to be cut to desired lengths.

The supporting table, in this instance, is provided by channel beams 16 having rollers 18 mounted between them to form a roller-feed surface to more easily move the lumber length-wise towards the saw. It also includes a fence or back-stop rail 20 against which the lumber is positioned, for square end cutting, and which extends right up to the saw.

On the supporting table 14 is disposed a lumber stop 22, best shown in the second drawing figure, which is guided on the back-stop rail 20 and which is engaged by the end of a piece of lumber to be cut.

The lumber stop member includes a base plate member 24 which has an angle iron strap 26 welded along its back side edge and a square tubular piece 28 welded to its leading side edge to form a shoulder stop wall. The base plate is long enough to provide sufficient length to span several of the rollers in the supporting table and is of such thickness as will provide the weight needed to keep it flat on the table. It is also cut at an angle, as shown, to save material and avoid undue roller drag.

A small cover housing 30 is provided on the back edge of the lumber stop, on the angle iron strap 26. It extends out behind the lumber stop and includes a suitable slot 32 in each end, as best shown in FIG. 9, so that the lumber stop can guide on the rail 20 along the back edge of the supporting table.

An arm 34 is provided on the cover housing, to extend down behind the supporting table 14, for engagement with a tensioning cable 36, from a cable reel 38 on the relatively opposite side of the power saw, so that the lumber stop is biased at all times towards the saw.

The cover member 30 has a flange 40 on its back edge which supports an air cylinder 42 that activates a wedge-locking link 44, within the cover, to engage and hold the whole lumber stop to the guide rail 20 on the table, at any desired position.

Figure 8:
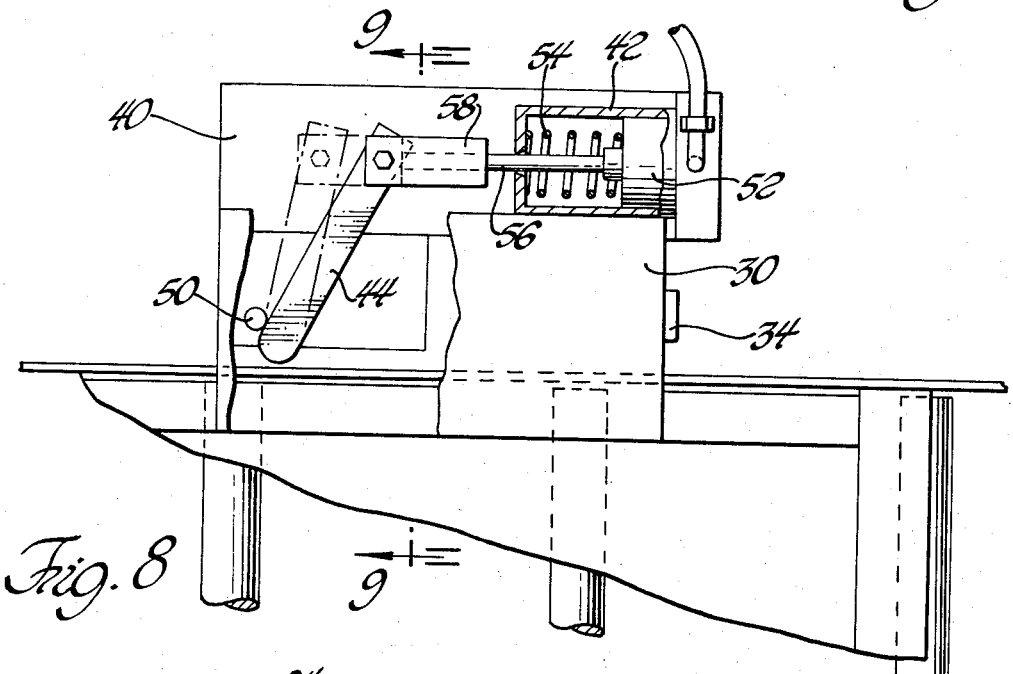
FIG. 8 is a further enlarged and fragmentary section showing the cover housing and air operated clamping means on the back of the lumber stop.
Figure 9:
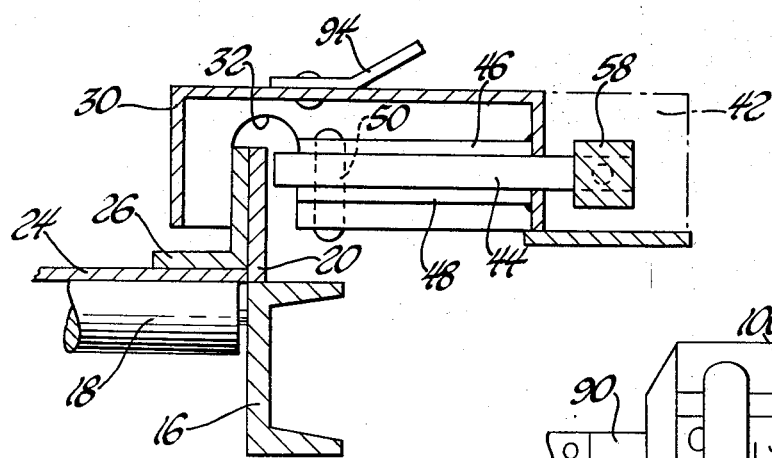
FIG. 9 is a cross sectioned view as seen essentially in the plans of line 9—9 in FIG. 8 and showing details of the lumber stop and its clamping means.

Referring to FIGS. 8 and 9, the cover member 30 is shown to include a pair of horizontally disposed guide wall members 46 and 48 welded into the corner of the cover housing to receive the wedge locking link 44 slidably therebetween and for pivotal abutment against a pin 50.

The air cylinder 42 includes a piston 52 under the return bias of a spring 54 and with its rod 56 connected to the locking link 44 by a yolk fitting 58. Actuation of the link 44 from its full line to dotted line position causes it to obtain the desired wedge-locking effect.

Air feed to the cylinder 42 is obtained by an air hose coil 60 provided on a supporting cable 62, strung behind the lumber supporting table 14. One end of the air hose coil is connected to a fitting on an arm 64 extended rearwardly off the cover housing 30, and which is in turn connected by a short hose section 66 to the air cylinder itself, and the other end of the air hose connects to a toggle valve 68 that is in turn connected by a hose section 70 to an air pressure source.

The toggle valve 68 is provided on a supporting bracket 72 near the power saw 10, so that the operator has ready access to it and can fix the lumber stop in any given position. This same bracket also includes a rearwardly extending arm 74 to which the supporting cable 62 for the air hose coil 60 is attached. And, at the other end of the lumber supporting table 14 is another supporting bracket 76 with a rearwardly extending arm 78 to which the other end of the air hose supporting cable is attached.

The two supporting brackets 72 and 76, at opposite ends of the table 14, are best shown in FIGS. 4-5 and 6-7, respectively.

The one nearest the saw includes a tape reel 80, canted at an angle and with a plastic block 82, that forms a "scope sight," provided close to it. The toggle valve 68 for the air hose is also mounted on the bracket arm 84 that supports the tape reel and the scope sight.

The other supporting bracket 76 includes another tape reel 86, canted at the same relative angle as the other tape reel, and provided relatively under the air hose cable arm 78.

Between the two tape reels 80 and 86 is provided an endless run of measuring tape 90. It is actually a length of ribbon steel measuring tape with its ends joined, fixed together, and in turn engaged to the cover housing 30 on the lumber stop member 22.

Figure 2:
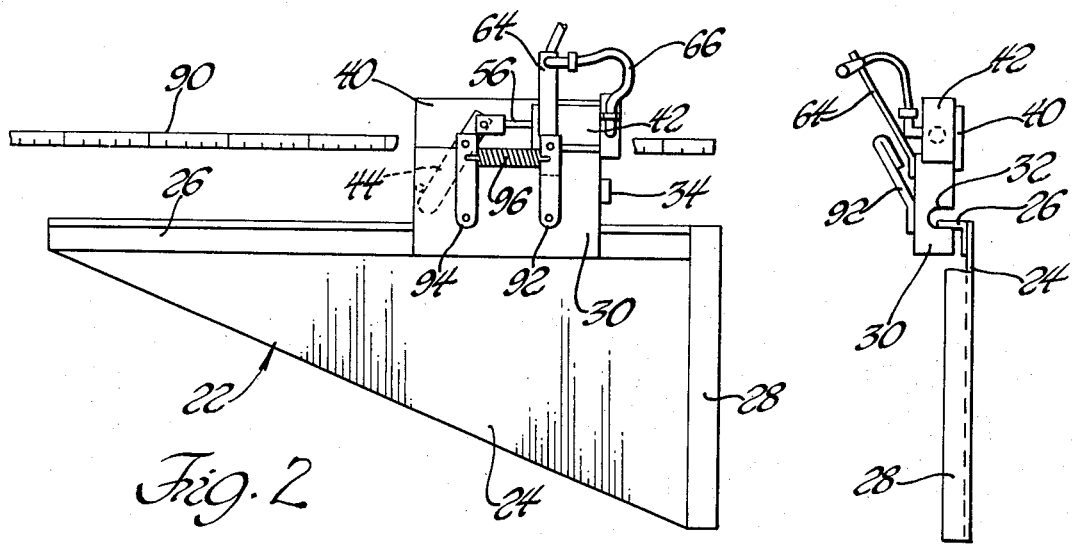
FIG. 2 is an enlarged top plan view of the lumber stop member of the present invention.
Figure 3:
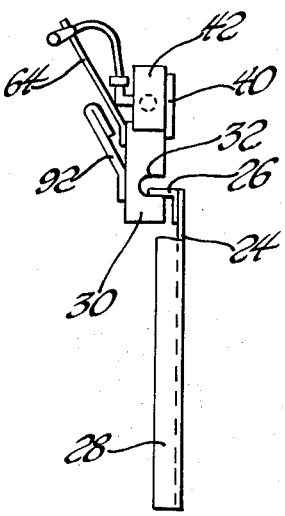
FIG. 3 is a side view of the lumber stop member as seen from the right side of the second drawing figure.
Figure 4:
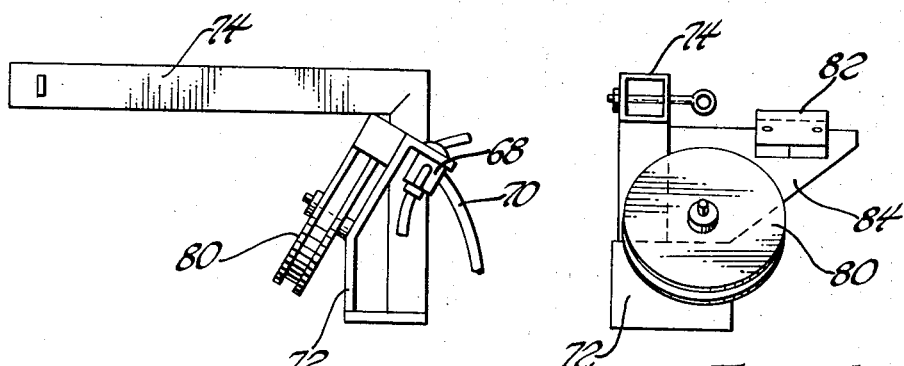
FIGS. 4 and 5 are detail side and back views of the bracket for the tape reel at the end of the work table nearest the saw.
Figure 5:
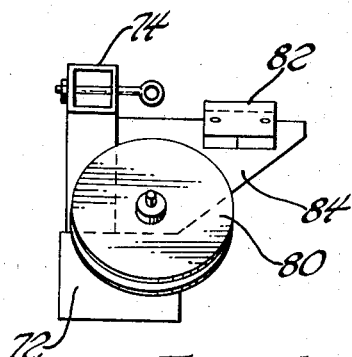
Figure 6:
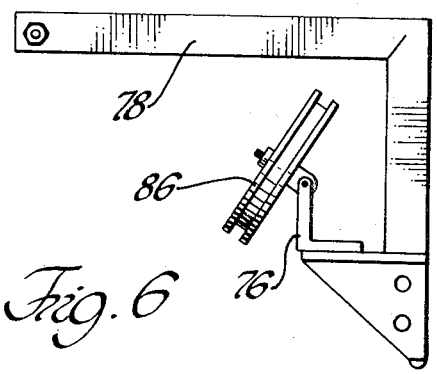
FIGS. 6 and 7 are detail side and back views of the bracket and tape reel at the far end of the work table.
Figure 7:
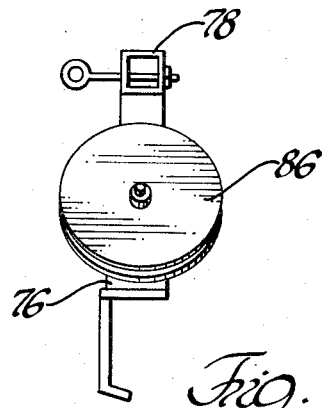

Referring to FIGS. 2 and 3, there is shown a pair of arms 92 and 94, with a spring 96 between them, on the top wall of the cover housing 30. One of these arms 92 is fixed in place and the other arm 94 is under the bias of the spring, and movable relative to the fixed arm, to keep the slack out of the measuring tape. The measuring tape is clamped to the fixed arm 92, passed under the scope sight 82 around the reel 80, then around reel 86, and under a clamp on the end of the biasing arm 94.

Figure 10:
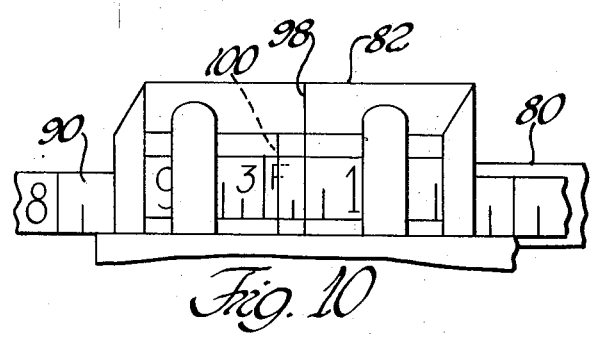
FIG. 10 is an enlarged perspective of the cross-hair scope for visual reading of the measuring tape.

The scope sight 82 is shown in FIG. 10 to include, as mentioned, a block of clear plastic. Lines 98 and 100 are scribed on opposite sides of the block so that the tape figures can be seen through the block and alignment of the lines over a given figure eliminates problems of parallax.

SET-UP AND USE

The angle iron fence or back step rail 20 is first mounted on the lumber supporting table 14 and up to the saw table.

The lumber stop member 22 is next set on the table with the guide fence in the slots in its cover housing 30.

Next, the two brackets 72 and 76 with the tape reels are mounted at opposite ends of the table, being sure that the one with the scope sight and toggle valve is nearest the saw, the calbe 62 is fastened to one, passed through the air hose coil 60 and fastened to the other, with a turn buckle connection as needed to take out slack, and the air hose connections are made to the air cylinder 42 on the cover housing and via the toggle valve 68 to the air supply source.

Once this is accomplished, the tensioning cable reel 38, which is installed first of course, is fastened to the depending arm on the cover housing 30. This may be done either with the lumber stop free to move on the table or in a wedge locked condition, since the air hose connections have been previously made.

With the lumber stop 22 located reasonably close to the scope-sight stand, the next step is to accurately measure the distance from the shoulder stop 28 to the inside of the saw blade. The lumber stop may be moved out to a given position, an accuractely measured distance from the blade, or moved in towards it, but must be fixed by activation of the wedge lock link 44 so that its position is fixed and known while the measuring tape is set up on the tape reels, which is the next step.

The movable clamping arm 94 is biased against its spring 96 and away from the fixed arm 92. The beginning end of the measuring tape is clamped to the fixed arm 92 nearest the saw and passed under the scope sight and around both tape reels, then back to the tensioned clamp arm 94. The two ends of the tape are brought together, between the tensioning arms 92–94, and the tape is adjusted so that the dimension appearing under the cross hairs of the scope sight is the measurement determined for the distance that the lumber stop is away from the saw blade. Then the tape is clamped securely and tensioned so that it will run smoothly over the tape reels, the excess of the tape is cut off and the two tape ends are fastened together.

Once the tension has been adjusted on the cable reel 38 so that the lumber stop moves smoothly when the air locked wedge clamp is released, the system is ready for use.

By butting the end of a piece of lumber to be cut against the lumber stop, with the air clamp off, the lumber will move the stop and cause the measuring tape to run over the reels and under the scope sight to any given distance, within the limits of the set up. By adjusting the lumber slightly, back and forth, the precise length dimension desired can be set under the cross hairs of the scope-sight. The toggle valve is then activated right at the saw to fix the air clamp, and in turn the lumber stop, so that the given piece of lumber and successive pieces, if desired, can be cut to the precise dimension required.

I claim:

1. Apparatus for use with a power saw having a work table for supporting lumber to be cut to desired lengths, and comprising; a fence rail provided on said work table for providing a back stop aligned with said saw and extending substantially the full length of said table, a member of sufficient relative weight and length for resting flat on said table and which is guided on said table and said fence rail for straight line reciprocal movement relatively towards and away from said power saw, said member including a shoulder stop wall substantially the width of said table and disposed on the side thereof next adjacent said saw for engagement with a length of lumber to be cut by said saw and for movement thereby relatively away from said saw, means provided near said saw and connected to said reciprocal member for biasing said member for movement towards said saw and in opposition to movement by a length of lumber relatively away therefrom to provide positive measuring contact therewith and return thereof, clamping means provided on said member for wedge locking engagement and relatively fixing said member to said fence rail and including means selectively operative thereof disposed next adjacent said saw for easy access and control thereof, tape reels mounted near opposite ends of said fence rail and having a measuring tape provided in an endless run around and therebetween, said measuring tape having the starting end thereof clamped to said reciprocal member for movement therewith and being set to measure at said saw the relative distance between the shoulder stop wall and the saw blade of said saw, and a cross-hair sight mounted near said saw and relatively over said measuring tape for visually reading the length of lumber butted against said shoulder stop and disposed for being cut by said saw.

* * * * *